United States Patent [19]

Benigni

[11] 4,013,499
[45] Mar. 22, 1977

[54] APPARATUS FOR SUPPORTING A TIRE WHILST A STRIP OF PREMOLDED TREAD IS BEING APPLIED THERETO IN ORDER TO RECONSTRUCT THE TREAD ON THE SAID TIRE

[75] Inventor: Italiana Benigni, Lucca, Italy
[73] Assignee: Ital-Rubber S.r.l., S. Alessio (Lucca), Italy
[22] Filed: Oct. 15, 1975
[21] Appl. No.: 622,648

[30] Foreign Application Priority Data
Oct. 31, 1974 Italy .................... 3514/74

[52] U.S. Cl. ................. 156/394; 156/96; 156/414; 301/11 CD
[51] Int. Cl.² ........................ B29H 17/38
[58] Field of Search ............. 156/414, 96, 394 R, 156/394 FM; 144/309 S, 288 A; 157/1.1, 1.35; 301/9 AU, 10 AU, 11 AU, 14, 17, 22, 26; 425/11, 17, 36

[56] References Cited
UNITED STATES PATENTS

| | | | |
|---|---|---|---|
| 2,480,578 | 8/1949 | Hodges | 425/17 |
| 3,219,078 | 11/1965 | Wright | 144/288 A |
| 3,236,709 | 2/1966 | Carver | 156/96 |
| 3,310,838 | 3/1967 | Sornsen | 425/11 |
| 3,614,969 | 10/1971 | Breiner | 144/288 A |
| 3,802,978 | 4/1974 | Barnett | 156/394 FM |
| 3,886,028 | 5/1975 | Hindin et al. | 156/96 |

Primary Examiner—Charles E. Van Horn
Assistant Examiner—John E. Kittle
Attorney, Agent, or Firm—Browdy and Neimark

[57] ABSTRACT

Apparatus for supporting a tire while being retreaded with a precured tread including sealing a tread and tire enclosing envelope adjacent the beads of the tire. The tire supporting rim is constituted by two coaxial tubular members with envelope sealing flanges, a first member of which is inserted axially in the second member, with the first and second members having around their circumference parts that can be connected to one another in a free and complementary fashion at the time said first member is inserted in said second member. Each of the tubular members have a plurality of grooves aligned in batches perpendicular to the axis of the tubular members with it being possible to lock the first member to the second member by partially rotating a disk housed in one of the aforementioned batches of grooves.

8 Claims, 6 Drawing Figures

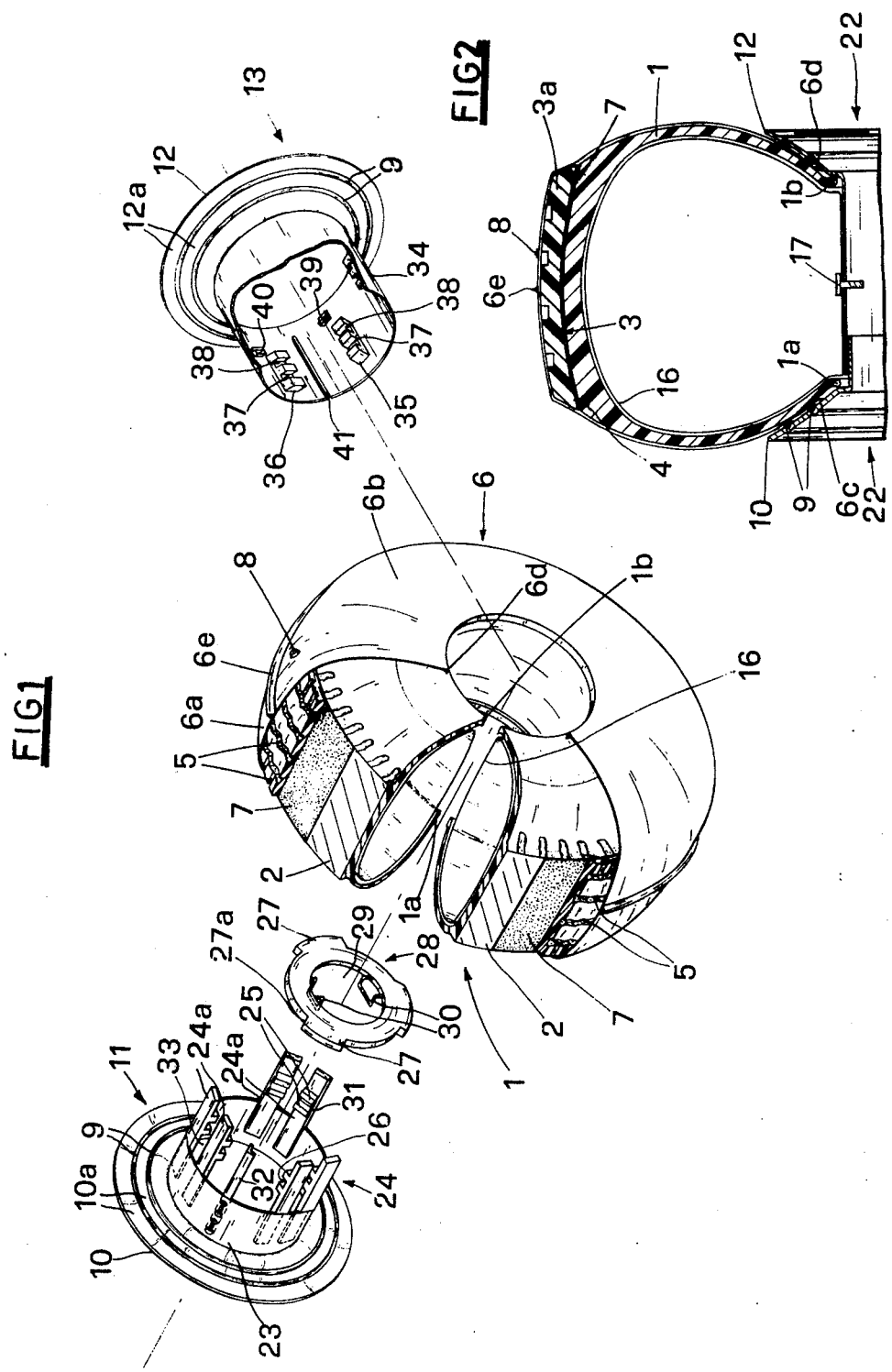

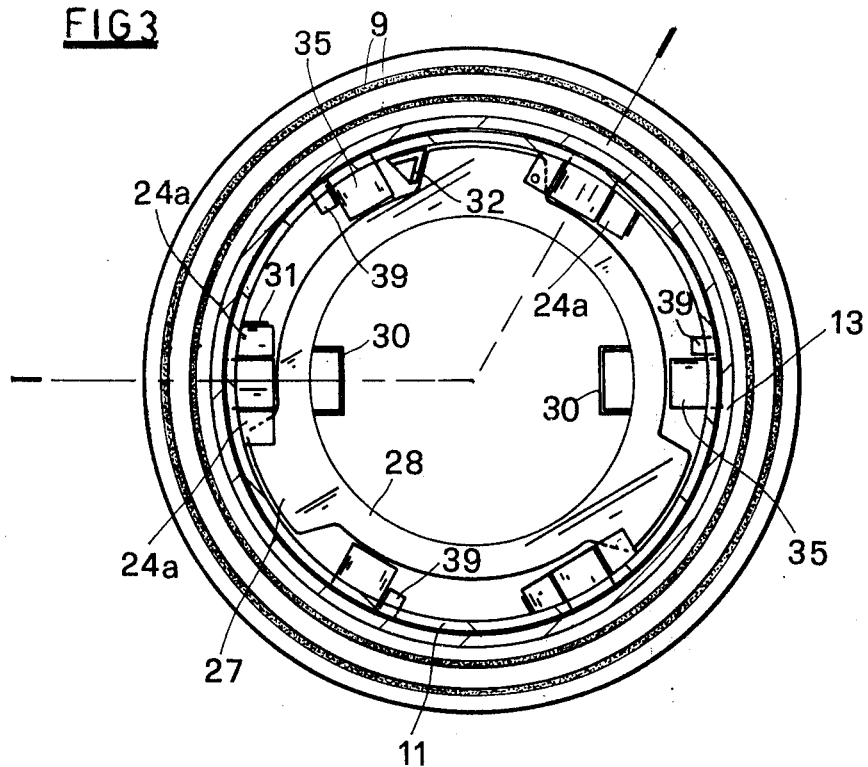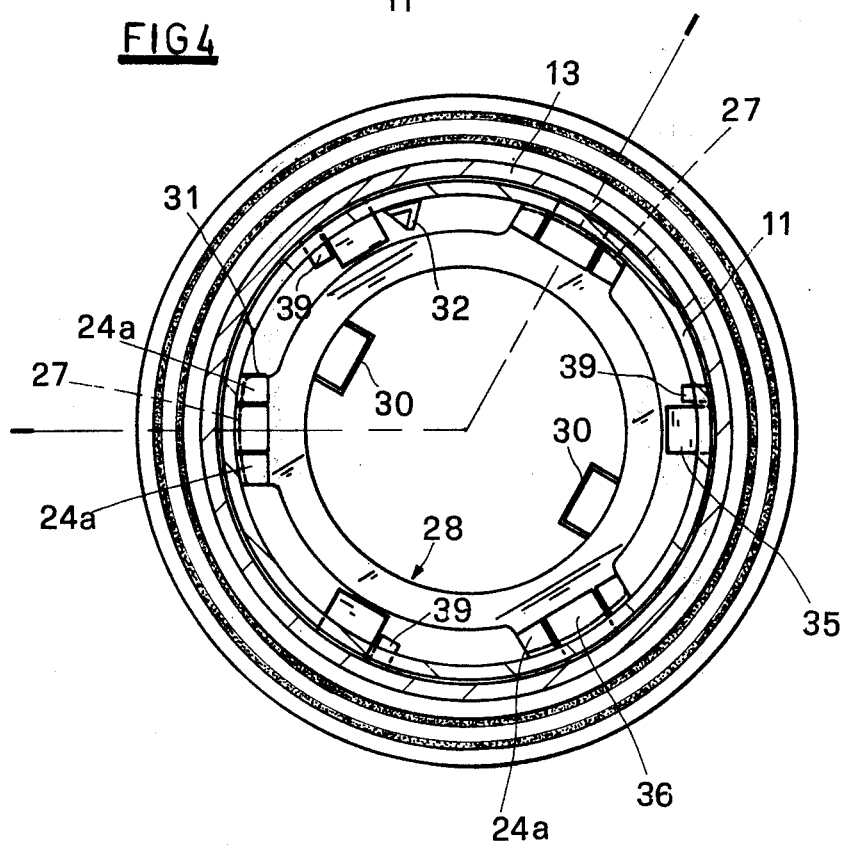

APPARATUS FOR SUPPORTING A TIRE WHILST A STRIP OF PREMOLDED TREAD IS BEING APPLIED THERETO IN ORDER TO RECONSTRUCT THE TREAD ON THE SAID TIRE

BACKGROUND OF THE INVENTION

This invention relates to an improved apparatus for supporting a tire whilst a strip of premolded tread is being applied thereto in order to reconstruct the tread on the sand tire.

DESCRIPTION OF THE PRIOR ART

To reconstruct the tread on a tire, two systems are generally used and both of these envisage the external circumferential surface of the tire, that is to say, the surface in direct contact with the road, being first rasped.

The first system consists in inserting the tire to be reconstructed, suitably fixed on a special rim, into a corresponding mold provided internally in the surface facing the rasped surface of the tire, with grooves complementary to those it is wished to fashion in the tread.

Subsequently into the said mold is inserted rubber, the resulting vulcanization of which, achieved at a suitable temperature using the right vulcanizing agents, enables the tread created between the rasped surface of the tire and the inner surface of the mold, to be tightly secured to the said rasped surface.

Since this particular type of tire reconstruction system requires a different mold for each type of tire and for tires which though of the same dimensions, have different grooves in the tread, it is considerably costly both for plant and maintenance, due to the high number of molds needed to guarantee the reconstruction of a vast range of tires and to the notable volume of rubber wastage this system has.

With the second known system for the reconstruction of tires, no mold has to be used and there is no wastage of rubber material.

Indeed with the second system, molding operations provide strips of rubber tread of the dimensions required and these, which are suitably grooved to suit the requirements, are excellent from an elasticity, duration and resistance to wear point of view.

A strip of tread thus obtained is applied around the periphery of the rasped surface of the tire to be reconstructed, with a suitable bonding means being interposed between the said rasped surface and the tread.

In this way an ensemble is created consisting of the tire, suitably fixed onto a special rim, the bonding means and the tread.

In order to obtain a circumferential bond between the tread and the rasped surface of the tire, it is necessary to bring the said ensemble up to a suitable temperature and, at the same time, to subject the said bonding means to a suitable radial pressure, being extremely careful to protect the outer surface of the tire and of the tread against atmospheric agents.

For the aforementioned circumferential bond to be uniform along the whole circumferential bonding surface between the tire and the tread, it is necessary that the radial pressure to which the bonding means is subjected be uniform.

The said uniform pressure is obtained (see in this connection U.S. Pat. No. 2,976,910) by first inflating the carcass of the tire to be reconstructed by means of a special inner tube brought up to a pressure which is virtually that at which the tire would normally have to work, after which the outer surface of the tread is subjected to a lower pressure obtained with a suitable fluid, air, in particular.

Naturally, as stated above, the outer surface of the tire and of the tread is protected against atmospheric agents through a flexible, circumferential, protective casing which has to be maintained closely up against the sidewalls of the tire in such a way as to act as a perfect seal.

Several ways are known of maintaining the casing closely up against the sidewalls of the tire to be reconstructed and a first solution envisages there being a rigid protective casing pressing tightly up against the sidewalls of the tire; with this the flexible casing is trapped between the vertical inner walls of the rigid casing and the sidewalls of the tire and, in consequence, is secured to the sidewalls of the said tire.

A solution of this nature presents various problems due both to the considerable overall dimensions of the rigid casing and to the fact that it is necessary to have a range of rigid casings of different dimensions to suit the various types of tires on the market and, additionally, the forced insertion of the said rigid casing between the sidewalls of the tire causes considerable rubbing to occur between the surfaces of the rigid casing in contact with the flexible protective casing which is detrimental to the operational life of the latter.

With a second solution for maintaining the casing closely up against the sidewalls of the tire to be reconstructed, the use is envisaged of two metal disks, each of which has to be forced between the bead on the tire and the rim on which the said tire is mounted. In this way the flexible protective casing is thus locked in an air tight fashion between the said metal disks and the bead on the tire to be reconstructed.

One difficulty that arises with the above mentioned solution stems from the fact that the forced contact between the metal of the said disks and the rubber of the protective casing causes considerable rubbing to occur at the time the said disks are forced between the rim and the bead and this notably prejudices the mechanical resistance of the edge of the protective casing thereby decreasing its operational life span considerably. This trouble becomes particularly acute when the said metal disks lock the protective casing up against the sidewalls of the tire following a partial rotation on their part when being inserted between the bead on the tire and the rim.

Another difficulty is on account of the fact that it is necessary to have available a vast range of protective casings with which to cover for the various dimensions of the tires on the market.

For this problem there is another solution (see in this connection U.S. Pat. No. 3,802,978) which envisages the use of two supplementary pressed steel circular members similar in shape to the bead on the tire, each having in the proximity of the outer border, a "V" shaped channel.

Each of the two edges of the flexible protective casing is locked inside the corresponding V-shaped channel through a steel spiral spring or a flexible rubber ring or a pressure clamp or lever.

With the aforementioned solution many problems exist, one being due to the considerable use of labour needed for locking the protective casing tightly to the tire.

Another is due to the fact that two supplementary circular members are essential for the said locking operation to be performed.

Yet another problem of considerable entity is that when locking the edge of the protective casing inside the said V-shaped channels of the supplementary circular members, contact takes place between the metal of the circular member and the rubber of the said protective casing, as well as between the said rubber and the fixing ring. The said contact notably prejudices the mechanical resistance of the edge of the protective casing because of the rubbing caused by the said contact at the time the fixing ring is inserted into the V-shaped channel and thus the operational life span of the said protective casing is consequentially decreased.

SUMMARY OF THE INVENTION

The object of the present invention is to overcome the aforementioned difficulties through an apparatus for supporting a tire whilst a strip of premolded tread is being applied thereto in order to reconstruct the tread on the said tire, the said apparatus having directly in the rim supporting the tire to be reconstructed, means for locking a protective casing in an air tight fashion up against the sidewalls of the tire; the said rim being made up of two members that can be locked together with suitable second means without any rotation on the part of the said members in order to achieve the said locking; the said second means allowing, moreover, the locking operation to be achieved with different width values for the rim.

Another object of the present invention is to provide the means for locking the protective casing in an air tight fashion up against the sidewalls of the tire in such a way that to perform the said locking operation there is no metallic contact with the said protective casing.

Another object still of the present invention is to make available an apparatus which satisfies the objects previously mentioned yet, furthermore, allows the locking and unlocking operations to take place in a simple, rapid and trouble free way, with the limited use of manual labour.

Yet a further but by no means last object of the present invention is to make available an apparatus of a cost that is limited with respect to its efficiency.

These objects and others still which will become more apparent from the description given herein have all been achieved with the apparatus according to the present invention comprising a rim which circumferentially supports the said tire, the outside surface of which, suitably prepared, has wound around it a strip of premolded tread, with special bonding means being interposed between the said strip of tread and the surface of the tire facing it and comprising a protective casing which closely externally enshrouds the said strip of tread and the sidewalls of the tire, extending up to the vicinity of the beading on the said tire, essential features of the apparatus in question being that the said rim is made up of two coaxial tubular members, a first member of which is inserted axially in the second member; both the said members having around their circumference parts that can be connected to one another in a free, complementary fashion at the time the first member is inserted in the second member, the said parts having a plurality of grooves aligned in batches along planes perpendicular to the axis of the said first and second member; it being possible to lock the said first member to the said second member and to unlock it therefrom by partially rotating in one direction or the other, a disk housed in one of the aforementioned batches of grooves; an essential feature of the said first and second member being that each has running around its circumference, a rim, which extends symmetrically with respect to a plane perpendicular to the axis of the tire supporting rim, their surfaces pointing towards the tire being shaped in such a way as to externally enshroud the bead on the tire and part of its sidewalls at the time the said members are locked one to the other, the said surfaces being provided with at least two grooves, one per lateral rim, extending in a direction parallel to the plane of symmetry, the said grooves housing integrally the same number of sealing rings as there are grooves these serving to lock the said protective casing up against the sidewalls of the tire in an air tight fashion.

BRIEF DESCRIPTION OF THE DRAWINGS

Further characteristics and advantages of the apparatus according to the invention will become more apparent from the following detailed decription of a preferred but not sole form of embodiment, illustrated purely as an unlimited example on the accompanying drawings which form an integral part of the description, in which:

FIG. 1 shows the apparatus according to the invention in a perspective, exploded view;

FIG. 2 shows a radial sectional view of the apparatus in question;

FIG. 3 shows in a plan view with a partial cutaway so as to emphasize certain constructional peculiarities, the two members that constitute the supporting rim in the open position;

FIG. 4 shows in a plan view with a partial cutaway so as to emphasize certain constructional peculiarities, the two members that constitute the supporting rim in the closed position;

DESCRIPTION OF THE PREFERRED EMBODIMENT

Figure 5:
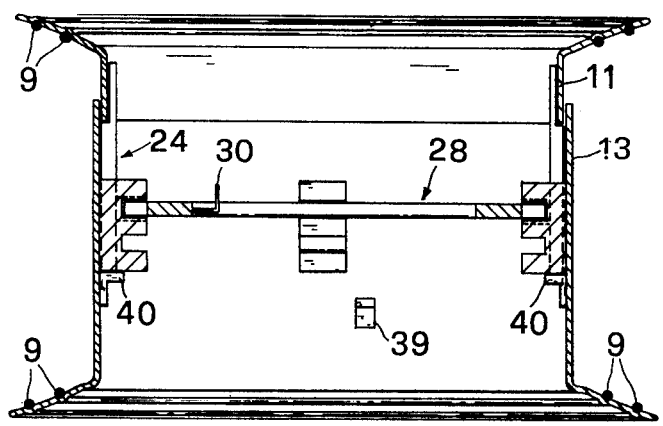
FIG. 5 shows a partial view of the front axial section of the aforementioned members in the minimum penetration position.

With reference to the above mentioned figures at 1 a tire is shown on which it is wished to reconstruct the tread. The circumferential surface of the said tire 1 has been suitably treated with automatic or manual rasping machines in order to provide it with a surface 2 which extends along a band of constant width, equidistant from the axis of the said tire, on planes perpendicular to the said axis and slightly convex along radial planes.

The width of the said surface 2 is slightly greater than that of a band 3 of premolded tread, the length of which is identical to the maximum circular length of the said surface 2.

The surface 4 of the band of premolded tread, devoid of the grooves 5, is kept tightly up against the surface 2 of the tire 1 by a protective casing 6 made of rubber resistant to a temperature of over 100° C. Between the said surfaces 4 and 2 is interposed a special bonding means 7 the purpose of which, as will be explained in detail hereinafter, is to stably attach the band 3 of tread to the surface 2 of the tire 1 at the time the said bonding means 7 is subjected to vulcanization.

The demensions of the protective casing 6 which is made up of two identical parts 6a and 6b circumferentially attached to one another along a joint 6e, are such that the outside of the tire 1 to be reconstructed and the band 3 of premolded tread is fully enshrouded right up to the proximity of the beading 1a and 1b on the tire 1. Furthermore, the casing 6 has in its part 6b, a valve 8 for discharging the air trapped in between the said casing and the aforementioned reconstructed tire.

The edges 6c and 6d of the said protective casing 6 are kept tightly up against the corresponding sidewalls of the tire, in an air tight fashion, by four rings 9 positioned bilaterally in pairs in such a way as to be symmetrical with respect to the plane of symmetry for the tire to be reconstructed.

A first pair of the said rings 9 is housed integrally in two corresponding grooves provided in the surface 10a, facing the tire 1, of a lateral rim 10 which extends in a circular fashion at one extremity of a first member 11 belonging to a supporting rim 22. The other pair of rings 9 is housed integrally in two corresponding grooves provided in the surface 12a, facing the tire 1, of a lateral rim 12 which extends in a circular fashion at one extremity of a second member 13 belonging to the said supporting rim 22.

The air tight locking of the edges 6c and 6d of the protective casing 6 up against the corresponding sidewalls of the tire 1 by means of the four rings 9 is rendered easier by the profile of the surfaces 10a and 12a in which grooves are provided for integrally housing the said rings 9 since the said surfaces 10a and 12a are shaped in a like manner to the corresponding surfaces facing the beading 1a and 1b and the sidewalls of the tire adjacent to the said beading.

The lateral rim 10 of the first member 11 of the supporting rim 22 is coaxial with a cylindrical tube 23, the section of which is circular, provided on the same side as the pair of rings 9.

At the extremity of the said tube three identical female parts 24 are provided and these which are spaced away from one another by 120°, extend parallel to the axis of the first member 11.

Each female part 24 consists of two rectangular section bars 24a separated by a space 33 and having, on the surface pointing towards the inside of the first member, two projections 25, parallel with each other, which delimitate a groove 26.

The grooves 26 in the bars 24a of the female parts 24 together form a batch of grooves placed on one and the same plane perpendicular to the axis of the first member 11.

In each pair of grooves 26 of one female part 24 is freely housed one corresponding projection 27 on a disk 28 whose central part has a hole 29 in it, on the lateral surface of which two opposite grips 30 are provided.

The said projections 27, spaced at 120° away from one another, can only partially rotate in the inside of the said grooves 26; in fact, when the disk 28 is rotated clockwise the lateral surfaces 27a of the projections 27 hit the corresponding stops 31 provided laterally and externally on the second bar 24a of each of the female parts 24.

When, instead, by means of the grips 30, the disk 28 is rotated counter clockwise, one of the lateral surfaces 27a of the projections 27 hits against a stop 32.

Although, when this happens, the projections 27 on the disk 28 are partly withdrawn from the grooves 26 in the female parts 24, since the stops 31 are not present they do not fully abandon the said grooves and thus do not move into the space 33 existing between each pair of side by side bars 24a.

The cylindrical tube 23 of the first member 11 is inserted axially into a cylindrical tube 34 provided in the second member 13 of the supporting rim 22.

At the time of the said insertion into the spaces 33, a set of three male parts 35 or 36 is inserted; prior to the said insertion, the disk 28 has to be set against the stop 32.

The said sets of three male parts 35 and 36 are provided with two grooves 37 and 38, respectively, each groove being aligned on a plane perpendicular to the axis of the second member 13.

When the set of three male parts 36 are inserted in the spaces 33, the front surface of one of the bars 24a hits against a stop 40; in this way the grooves 26 in the first member 11 are aligned on the same plane with the grooves 37 in the second member 13 and thus the minimum penetration position for the said members 11 and 13 is obtained (in this connection see FIG. 5).

Figure 6:
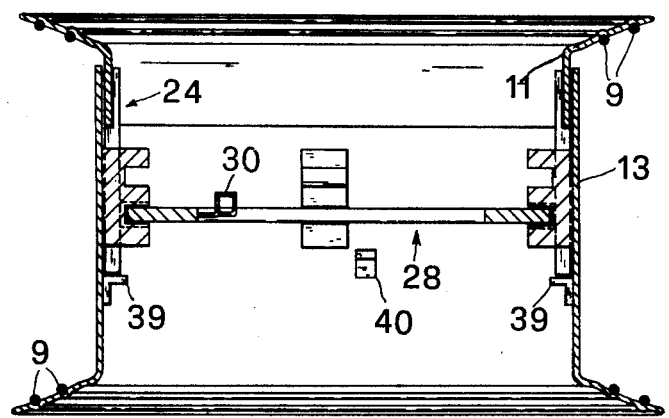
FIG. 6 shows a partial view of the front axial section of the aforementioned members in the maximum penetration position.

In the event, instead, of the set of three male parts 35 being inserted in the spaces 33, the front surface of one of the bars 24a hits against a stop 39 situated at a lower level than the stop 40; in this way the grooves 26 in the first member 11 are aligned on the same plane with the grooves 38 in the second member 13 and thus the maximum penetration position for the said members 11 and 13 is obtained (in this connection see FIG. 6).

Once the outer surface of the tire has been rasped, the bonding means 7 is first wound around it and then, subsequently, the band 3 of premolded tread is then applied thereto.

After the said band 3 has been subjected to a mechanical rolling operation in order to achieve the maximum adhesion between the inner surface 4 of the tread and the surface 2 of the tire 1, as well as the total expulsion of air therefrom, the protective casing 6 is placed around the tire 1 to which the bonding means 7 and the tread 3 have been applied.

The dimensions of the protective casing 6 are such that its edges 6c and 6d are positioned in the proximity of the outer surfaces of the bead 1a and 1b of the tire 1. Subsequently after having fitted an inner tube 16 inside the tire 1, the transverse through hole in the tire 1 is coupled to the cylindrical tube 34 belonging to the second member 13 and care must be taken to ensure that the valve 17 of the inner tube 16 slides axially in a rectilinear slit 41 which goes right through the said cylindrical tube 34.

Then with the disk 28 up against the stop 32, the first member 11 is inserted into the second member 13. The insertion, as explained earlier on, can take place by inserting either the set of three male parts 35 or 36 into the female parts 24. The actual choice of the male parts 35 or 36 depends on the width of the tire in the region of the bead 1a and 1b.

Following the said insertion, the two members 11 and 13 of the supporting rim 22 are locked to each other by rotating the disk 28 clockwise by means of the grips 30 until it hits against the stops 31 and the closed position of the two members 11 and 13 is thus obtained (see FIG. 4).

In consequence of this, the said rings 9 press heavily against the edges 6c and 6d of the protective casing 6 in such a way as to lock, in an air tight fashion, the casing 6 to the outside surface of the sidewalls of the tire.

The said locking operation is achieved by the forced contact between the rings 9, which are made of rubber or synthetic resin, and the edges of the protective casing 6. Thanks to the rubber-rubber or synthetic resin-rubber contact and the absence of rubbing at the time the locking operation is performed since it does not involve any rotation between the members 11 and 13, the mechanical resistance of the said edges of the protective casing 6 is in no way impaired nor is the operational life span of the said casing shortened.

The tire to be reconstructed is subsequently placed in a special oven (not shown on the drawings) duly mounted on its supporting rim 22, so that it can be given the necessary heat treatment.

The valve 8 is connected, via a flexible tube, to external apparatus for the air present between the casing 6 and the outer surface of the tire to be reconstructed, enshrouded by the said casing 6, to be purged.

The valve 17 of the inner tube 16 is connected, via a flexible tube, to a pump which creates inside the said inner tube 16 the normal working pressure of the tire 1.

Subsequently hot air is injected into the oven at a temperature of around 100° C, at a pressure higher than that of the atmosphere but a few units below the pressure of the air present in the inner tube 16 so as to obtain a resulting pressure which radially compresses the casing 6 and, consequently, the tread 3, towards the inside of the tire 1.

The temperature of the hot air is sufficient to cause the bonding means to be vulcanized in a period of time, which for truck tires, is around 4–5 hours.

When the said vulcanization is over and the now reconstructed tire complete with its supporting rim 22 and protective casing 6 has been removed from the oven, the said protection then has to be removed.

To do this all that has to be done is to bring the two tubular members 11 and 13 into the open position and this is achieved by rotating the disk 28 counter clockwise until it hits against the stop 32 (see in this connection FIG. 3).

Afterwards, using the grips 30, the first member 11 is withdrawn from the second member 13, thereby nullifying the contact between the rings 9 and the edges 6c and 6d thereby unlocking the protective casing 6 from the now reconstructed tire and thus the removal of the said casing from the said tire does not involve any danger of rubbing or damaging either the edges 6c and 6d of the casing or the casing itself.

The advantages offered by the above described apparatus fully answer the objects the present invention set out to achieve.

The locking of the protective casing to the sidewalls of the tire to be reconstructed is, in fact, achieved with rubber or synthetic resin rings provided directly in the rim supporting the tire. Furthermore, both when performing the locking and the unlocking operation with which the protective casing is secured to and released from, respectively, the sidewalls of the tire, there is an absence of any movement between the rings and the protective casing by virtue of the fact that the two members constituting the supporting rim can be locked and unlocked without any rotation movement and thus neither the said locking nor the said unlocking operation is prejudicial to the mechanical resistance of the protective casing nor does it affect the operational life span of the said casing.

Another advantage is due to the conformation of the male parts which allow a disk 28 to lock the two members 11 and 13 with different width values of the supporting rim 22.

Yet another advantage is due to the extremely rapid and easy way in which the locking operation takes place as a result of the fact that the rings 9 are integral with the lateral rims of the two members 11 and 13 of the supporting rim 22, as well as to the particular conformation both of the inner surfaces of the said lateral rims and of the said members 11 and 13.

It is understood that the description given above as an unlimited example can be varied, adapted or combined without in any way deviating from the framework of the present invention, as described and illustrated herein, or from the protection afforded to the following claims.

What is claimed is:

1. An improved apparatus for supporting a tire whilst a strip of premolded tread is being applied thereto in order to reconstruct the tread on the said tire, the apparatus comprising a rim which circumferentially supports the said tire, the outside surface of which, suitably prepared, has wound around it a strip of premolded tread, with special bonding means being interposed between said strip of tread and the surface of the tire facing it and including a protective casing which closely externally enshrouds the strip of tread and the side walls of tire, extending up to the vicinity of the beading on the tire, said rim being constituted by two coaxial tubular members, a first member of which is inserted axially in the second member, said first and second members having around their circumference parts that can be connected to one another in a free and complementary fashion at the time said first member is inserted in said second member, said parts having a plurality of grooves aligned in batches along planes perpendicular to the axis of said first and second member, it being possible to lock said first member to said second member and to unlock it therefrom by partially rotating in one direction or the other, a disk housed in one of the aforementioned batches of grooves, said first and second tubular members being provided externally with a rim portion extending symmetrically with respect to a plane perpendicular to the axis of the tire supporting rim wherein the surface pointing towards the inside of the said tire supporting rim is shaped to externally enshroud both the bead on the tire and part of the side walls thereof at the time said members are locked one to the other, and at least two further grooves provided on said surface and extending in a direction parallel to the plane of symmetry, said further grooves housing integrally the same number of sealing rings as there are grooves, these serving to lock the said protective casing up against the side walls of the tire in sn air tight fashion.

2. An improved apparatus according to claim 1, wherein on the first tubular member there are female parts, angularly spaced one from the other, each consisting of two identical parts side by side and interspaced in such a way as to allow a complementary male part with which the second tubular member is provided to be freely coupled between them; the said male parts belonging to the second tubular member being numerically multiple to the number of female parts with which the first member is provided; the said male parts having fixed to them stops against which the end of at least one female part belonging to the first member knocks during the coupling operation with the corresponding male part of the second member, this stop determining the insertion depth of the first tubular member in the second tubular member.

3. An improved apparatus according to claim 2, wherein the said stops for determining the insertion depth of the first tubular member in the second tubular member are connected to the latter at various heights in groups of a number identical to the female parts of the first tubular member, the male parts in each group being angularly interspaced by an angle which is the same as that at which the female parts of the first tubular member are spaced.

4. An improved apparatus according to claim 2, wherein corresponding to where its female parts are located, the first tubular member is provided with a number of stops to limit the rotation in both directions of the disk which enables the first tubular member to be locked into and unlocked from the second tubular member; the stops provided to limit the rotation of the said disk at the time the first tubular member is being unlocked from the second tubular member being arranged in such a way as to prevent the said disk from being fully withdrawn from the grooves in the said female parts.

5. An improved apparatus according to claim 1, wherein the said disk has at least two gripping members for its rotation and for inserting and disconnecting the first tubular member, into and from, respectively, the second tubular member.

6. An improved apparatus according to claim 1, wherein the said sealing rings are made of rubber.

7. An improved apparatus according to claim 1, wherein the said sealing rings are made of synthetic resin.

8. An improved apparatus according to claim 4, wherein the said disk has at least two gripping members for its rotation for inserting and disconnecting the first tubular member, into and from, respectively, the second tubular member.

* * * * *